No. 692,986. Patented Feb. 11, 1902.
E. J. COUCH.
REVERSIBLE PLOW.
(Application filed Aug. 19, 1901.)
(No Model.)
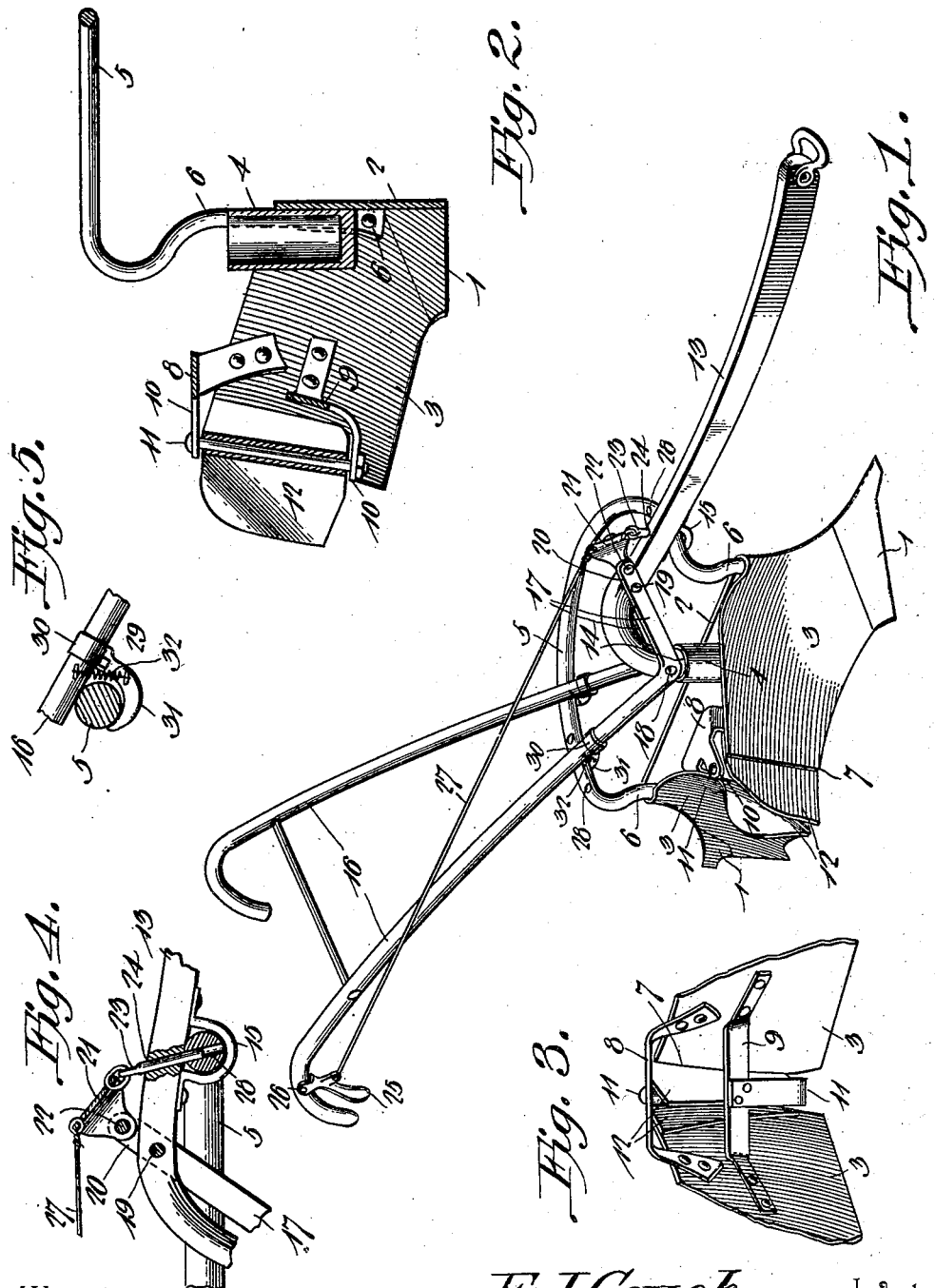
Witnesses:
J. Frank Culverwell.
J. W. Garner
E. J. Couch, Inventor,
by C. A. Snow & Co.
Attorneys

UNITED STATES PATENT OFFICE.

ERWIN J. COUCH, OF MEDFORD, WISCONSIN.

REVERSIBLE PLOW.

SPECIFICATION forming part of Letters Patent No. 692,986, dated February 11, 1902.

Application filed August 19, 1901. Serial No. 72,560. (No model.)

*To all whom it may concern:*

Be it known that I, ERWIN J. COUCH, a citizen of the United States, residing at Medford, in the county of Taylor and State of Wisconsin, have invented a new and useful Reversible Plow, of which the following is a specification.

My invention is an improved reversible plow; and it consists in the peculiar construction and combination of devices hereinafter fully set forth and claimed.

In the accompanying drawings, Figure 1 is a perspective view of a reversible plow embodying my improvements. Fig. 2 is a detail transverse sectional view taken on a plane intersecting the landside-plate, at the center thereof. Fig. 3 is a detail perspective view showing the inner sides of the moldboards, the bridge-bars which connect them, and the pivotally-mounted turning-wings, which form extensions of the moldboards. Fig. 4 is a detail elevation, partly in section, showing a portion of the beam, the semicircular bar which connects the ends of the plows, the front upwardly-extended arm of one of the handles, and the locking-bolt, which locks the beam to the said semicircular bar. Fig. 5 is a fragmentary detail view, partly in section, showing the arrangement of one of the abutments or shoulders for relieving strain from the plow-handles.

In the embodiment of my invention the oppositely-disposed shares 1 are connected together by a landside-plate 2, to the ends of which are secured the moldboards 3. On the inner side of the landside-plate, at the center thereof, is a vertically-disposed cylindrical socket-piece 4, which may be either formed separately from the landside-plate and secured thereto or formed integrally therewith when the landside-plate is a casting. A semicircular bar 5 has its ends downturned to form arms 6, which are secured to the landside-plate at the ends thereof, as shown in Fig. 1. The semicircular portion of the said bar 5 is disposed in a horizontal plane and is concentric with the axis of the cylindrical socket-piece 4. The outer portions of the moldboards 3 are truncated, as at 7, and the said moldboards are connected together on their inner sides by bridge-bars 8 9, the former being disposed a suitable distance above the latter. Each of the said bridge-bars is provided with an arm 10, and in the said arms are openings which form bearings for the pivot 11 of a pair of united turning-wings 12, which are disposed between the said moldboards and are adapted to play axially. The said wings have inwardly-extending portions, which are adapted to bear against the inner sides of the moldboards alternately, according to the direction in which the plow is moving, and it will be understood that the said wings 12 form extensions of the said moldboards and in operation cause the mold or sod to be completely overturned.

The beam 13 is formed at its rear end with a standard 14, having a vertical terminal portion which fits in the socket 4, the said standard and the said socket serving to pivotally mount the plow, so that the beam may be turned in either direction. The beam is provided with a keeper 15 on its under side, which embraces the semicircular bar 5, the said keeper serving to retain the standard in the pivotal socket 4. The handles 16 are provided at their lower front ends with upwardly and forwardly extending arms 17. The said handles at the angles between the same and the said arms are bolted to the standard 14, as at 18. Said arms 17 of the said handles bear against opposite sides of the beam near the rear end of the latter and are bolted thereto, as at 19, thereby bracing the beam and standard, as will be understood, and the front upper ends of the said arms 17 extend above the beam, as at 20. A link 21, which may be either of the form here shown or of any other suitable form, is pivotally mounted between the extended ends 20 of said arms 17, as at 22. A locking-bolt 23 is connected to the said link and operates in an opening 24, with which the beam is provided. A suitable finger-piece 25 is pivotally attached to one of the handles, as at 26, and is connected to the said link 21 by a cord, wire, chain, or rod 27. By this means the locking-bolt 23 may be readily operated. The semicircular bar 5 is provided with suitable openings 28 at appropriate points, which openings, when one of them registers with the opening 24 of the beam, may be engaged by the bolt 23 to lock the beam to the said semicircular bar 5. Hence the beam when adjusted with relation to the reversible plow may be readily locked thereto. By the provision of the openings 28 the plow may be readily adjusted to cut wide or narrow furrows, as will be readily understood by reference to Fig. 1.

To remove strain from the standard 14 when the plow-handles are raised, the said handles are provided with abutments or shoulders 29, adapted to bear against the under side of the bar 5, as shown in Fig. 1, by which arrangement it will be seen that upon tilting the handles the said bar will bear the strain, thereby obviating danger of straining or breaking the standard. Each of the abutments comprises a casting provided with an orificed head 30 to embrace the plow-handle and with an extension 31 to bear against the under side of the bar 5, the head being so assembled with the handle as to be free to rotate thereon, whereby it may be moved out of engagement with the said bar, but will be held against longitudinal movement on the handle. To hold the extension 31 in line with the handles or in position to project under the bar 5, two springs 32 are employed—in this instance coiled springs—one terminal of each spring being secured to the said extension 31 and the other terminal to the plow-handle.

It will be understood that my improved reversible plow may be used on hillsides or on level land, that by means thereof all the furrows may be turned in one direction, and that by its use the formation of dead-furrows in a field is entirely obviated.

Having thus described my invention, I claim—

1. In a reversible plow, the oppositely-disposed moldboards, bridge-bars on the inner sides thereof connecting the same together and turning-wings united together and disposed between the proximate portions of said moldboards and pivotally supported by said bridge-bars, substantially as described.

2. In a reversible plow, a landside-plate, reversely-disposed moldboards secured to the ends of said landside-plate, projecting laterally from one side thereof and converging toward each other, bridge-bars on the inner sides of said moldboards and connecting them together, turning-wings, united together and disposed at an outwardly-opening angle, and between the proximate portions of the moldboards, said united turning-wings being pivotally connected to the said bridge-bars, substantially as described.

3. A reversible plow, having a pivotal socket at the center of the landside-plate, and a semicircular laterally and horizontally disposed bar with downturned ends secured to the ends of the landside-plate, in combination with a beam, a standard, the latter being pivotally mounted in said socket, a keeper on said beam engaging said semicircular bar, and means to lock said beam to said bar when adjusted, substantially as described.

4. In a reversible plow, a landside-plate carrying a semicircular, laterally-disposed bar, in combination with handles carrying abutments to engage the under side of the bar, substantially as and for the purpose specified.

5. In a reversible plow, a landside-plate having a semicircular laterally-disposed bar, in combination with a beam having a standard pivotally attached to said landside-plate, and handles attached to said beam and slidably connected to said laterally-disposed bar, substantially as described.

6. In a reversible plow, the combination of a landside-plate having a semicircular laterally-disposed bar, a beam having a standard pivotally attached to said landside-plate, and handles, attached to the beam, slidably connected to said laterally-disposed bar, and having upwardly and forwardly extending arms secured to the beam, substantially as described.

In testimony that I claim the foregoing as my own I have hereto affixed my signature in the presence of two witnesses.

ERWIN J. COUCH.

Witnesses:
H. J. WOLLENBERG,
J. A. BARAGER.